United States Patent [19]

Ishizuka

[11] Patent Number: 5,281,803
[45] Date of Patent: Jan. 25, 1994

[54] IMAGE SENSOR AND INFORMATION PROCESSING APPARATUS

[75] Inventor: Haruo Ishizuka, Kawasaki, Japan

[73] Assignee: Canon Kabushiki Kaisha, Tokyo, Japan

[21] Appl. No.: 42,901

[22] Filed: Mar. 26, 1993

Related U.S. Application Data

[63] Continuation of Ser. No. 797,916, Nov. 26, 1991, abandoned.

[30] Foreign Application Priority Data

| Nov. 26, 1990 | [JP] | Japan | 2-324562 |
| Feb. 28, 1991 | [JP] | Japan | 3-55615 |
| Jun. 14, 1991 | [JP] | Japan | 3-169134 |

[51] Int. Cl.⁵ .................................... H01J 40/14
[52] U.S. Cl. .................... 250/208.1; 250/239
[58] Field of Search ............ 250/208.1, 239, 216, 250/227.2; 358/213.1, 484; 355/1; 257/433, 443

[56] References Cited

U.S. PATENT DOCUMENTS

| 4,461,956 | 7/1984 | Hatanaka et al. | 250/578 |
| 4,675,534 | 6/1987 | Sekimura et al. | 250/578 |
| 4,680,644 | 6/1987 | Shirato et al. | 358/294 |
| 4,682,190 | 7/1987 | Ikeda | 346/154 |
| 4,723,129 | 2/1988 | Endo et al. | 346/1.1 |
| 4,733,098 | 3/1988 | Seito et al. | 250/578 |
| 4,737,653 | 4/1988 | Nakagawa et al. | 250/578 |
| 4,740,796 | 4/1988 | Endo et al. | 346/1.1 |
| 4,783,700 | 11/1988 | Nagane | 358/213.11 |
| 4,791,469 | 12/1988 | Ohmi et al. | 357/30 |
| 4,791,493 | 12/1988 | Ogura et al. | 358/294 |
| 4,810,896 | 3/1989 | Tanaka et al. | 250/578 |
| 4,819,063 | 4/1989 | Sugiura et al. | 358/75 |
| 4,873,579 | 10/1989 | Kubota et al. | 358/471 |
| 4,905,097 | 2/1990 | Watanabe et al. | 358/456 |
| 4,920,431 | 4/1990 | Ogura et al. | 358/496 |
| 5,015,837 | 5/1991 | Hiroi et al. | 250/208.1 |
| 5,034,806 | 7/1991 | Ikeda et al. | 358/75 |
| 5,038,027 | 8/1991 | Ioka | 250/208.1 |
| 5,052,776 | 10/1991 | Fukushima et al. | 250/208.1 |

FOREIGN PATENT DOCUMENTS

| 0294834 | 12/1988 | European Pat. Off. . | |
| 57-101468 | 6/1982 | Japan | H04N 1/028 |
| 60-124167 | 7/1985 | Japan | H04N 1/04 |
| 60-218966 | 11/1985 | Japan | H04N 1/028 |
| 61-253588 | 11/1986 | Japan | G06K 9/20 |
| 61-278265 | 12/1986 | Japan | H04N 1/028 |
| 62-123865 | 6/1987 | Japan | H04N 1/028 |
| 62-248365 | 10/1987 | Japan | H04N 1/028 |
| 63-026067 | 2/1988 | Japan | H04N 1/04 |
| 63-182958 | 7/1988 | Japan | H04N 1/028 |
| 1-125168 | 5/1989 | Japan | H04N 1/028 |
| 1-216666 | 8/1989 | Japan | H04N 1/028 |
| 2-022872 | 1/1990 | Japan | H01L 31/10 |
| 2-268563 | 11/1990 | Japan | H04N 1/028 |
| 4-52157 | 2/1992 | Japan . | |

OTHER PUBLICATIONS

IEEE Transactions on Electron Devices 37 (1990) May, No. 5, New York, US, entitled "Characteristics of p-i Junction Amorphous Silicon Stripe-Type Photodiode Array and its Application to Contact Image Sensor" by Masahiro Hayama.

Primary Examiner—David C. Nelms
Attorney, Agent, or Firm—Fitzpatrick, Cella, Harper & Scinto

[57] ABSTRACT

An image sensor has a supporting member for integrally supporting a reading system including illuminating means for illuminating an original document, a photoelectrically converting means and imaging means for imaging light reflected by the surface of the original document onto the photoelectrically converting means, and has a member disposed on the side surface of the supporting member. The image sensor has two or more substantially independent spaces formed in the supporting member. The illuminating means, the imaging means and the photoelectrically converting means are accommodated in one of the spaces.

44 Claims, 14 Drawing Sheets

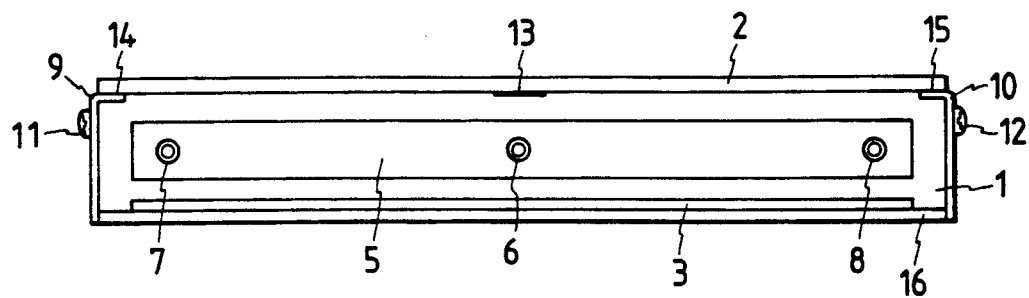
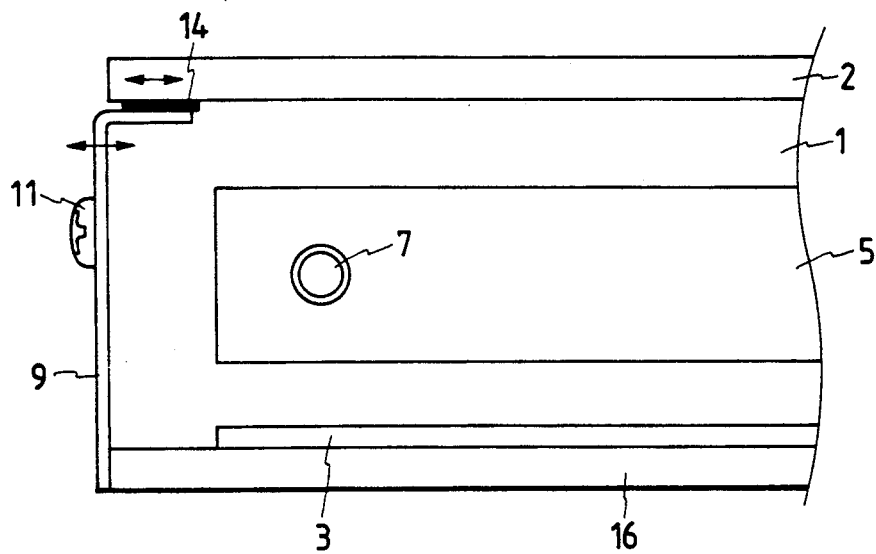

FIG. 8
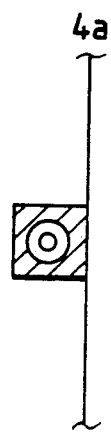
4a
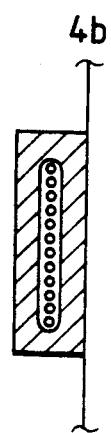
4b
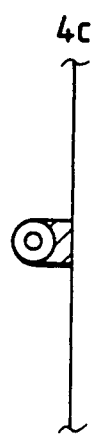
4c
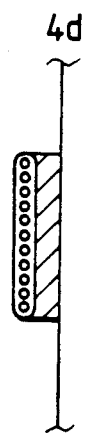
4d
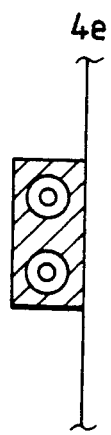
4e
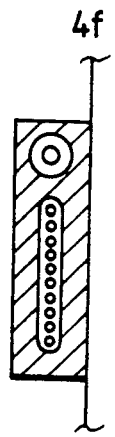
4f
4g

IMAGE SENSOR AND INFORMATION PROCESSING APPARATUS

This application is a continuation of application Ser. No. 07/797,916 filed Nov. 26, 1991, now abandoned.

BACKGROUND OF THE INVENTION

1. Field of the Invention

The present invention relates to an information processing apparatus on which a contact type image sensor for use in an image reader, a facsimile machine or the like is mounted. More particularly, the present invention relates to an improvement in the composition of parts of the above-described contact type image sensor.

2. Related Background Art

FIG. 1A is a schematic side elevational view which illustrates a conventional contact type image sensor. FIG. 1B is a partial enlarged view of the same. FIG. 2 is a schematic structural view which illustrates the image sensor mounted on the body of the apparatus. As shown in FIGS. 1 and 2, the conventional contact type image sensor is arranged in such a manner that one hollow portion 50 is created by a frame 51, a reading glass 52, a bottom plate 53, side plates 54 and the like. Furthermore, optical elements, such as an LED array 55, a SELFOC lens 56 and a sensor substrate 57, are accommodated in the above-described hollow portion 50.

However, in the above-described conventional structure, the leading portions of screws 58 for use in assembling the elements undesirable appear in the hollow portion 50 in which the optical elements are accommodated. Therefore, chips 59 genenerated in a tap portion at the time of tightening the screw 58 are undesirably introduced into the above-described hollow portion 50. As a result, the chips 59 will adhere to the open side of the lens, the reverse side of the reading glass and the surfaces of the sensor devices and the like and thereby the image is adversely critically influenced. The above-described problem becomes seriously in a case where the contact type image sensor has an improved reading resolution because a small chip will adversely affect the quality of the formed image.

The oxidation and optically adverse influence upon the frame 51 have been prevented by applying a black insulating material to the surface of the frame 51 after the frame 51 has been formed into the final shape. Therefore, no electrical connection has not been established between the above-described frame 51 and the bottom plate 53 and the side plates 54 which accommodate the optical elements.

As a result, although the above-described bottom plate 53 and the side plates 54 are disposed to surround the above-described frame 51, the force to shield electric waves becomes insufficient and an undesirable antenna effect is generated, causing the following problems to take place in a case where the contact type image sensor is, as described above, mounted on an apparatus such as an image reader.

That is, it is difficult, for the structure composed of the frame 51, the bottom plate 53 and the side plates 54 to confine the electric waves which have been generated in the sensor substrate 57 when the contact type image sensor is operated. As a result, the radiant noise characteristics will be deteriorated because the electric waves can easily leak outside. Because of the same reason, the force to shield the electric waves made incident from the external portion of the contact type image sensor is insufficient. Therefore, the contact type image sensor cannot be operated stably. In order to overcome the above-described problems, it might be feasible to employ a structure arranged in such a manner that a large quantity of the ground wires are used or an electric wave shield tape is used. However, the overall cost will be enlarged excessively in this case.

The above-described problems become more seriously in a case where the regulation of radiant noise, which has been intensified recently, must be met or when the apparatus is arranged to adapt to the electric waves the frequency of which has been raised or strengthened and to take a measurement against the deterioration in the resistance against external noise which will be taken place when the speed of the operational clock of the contact type image sensor is raised in order to improve the reading resolution and to raise the reading speed.

Furthermore, since the LED array 55, which is the heat generation source, is usually disposed adjacent to the central portion of the frame 51, it is difficult to satisfactorily discharge the accumulated inside heat.

It becomes more difficult to overcome the above-described problem of the heat radiation in a case of a small apparatus. Furthermore, if the reading resolution of a document reading apparatus is desired to be improved or its speed is intended to be raised, a strong light source must be used, causing a serious problem to arise in that the calorific power is excessively enlarged.

SUMMARY OF THE INVENTION

An object of the present invention is to prevent a malfunction of an image sensor by improving the structure of a supporting member and thereby improving the reliability of the image sensor.

Another object of the present invention is to provide an image sensor having a supporting member for integrally supporting a reading system including illuminating means for illuminating an original document, a photoelectrically converting means and imaging means for imaging light reflected by the surface of the original document onto the photoelectrically converting means, and having a member for converting the side surface of the supporting member, wherein the image sensor comprising: two or more substantially independent spaces formed in the supporting member, and wherein the illuminating means, the imaging means and the photoelectrically converting means are accommodated in one of the spaces and to as well provide an information processing apparatus on which the image sensor is mounted.

Another object of the present invention is to provide an image sensor comprising: illuminating means for illuminating an image information surface of an original document; imaging means for imaging light reflected from the image information surface of the original document by the illuminating means; a light receiving device disposed on the image surface of the reflected light, arranged to photoelectrically convert the reflected light and arranged to receive image information; a supporting member for integrally holding the illuminating means, the imaging means and the light receiving device; and means for fixing the supporting member, wherein the supporting member is made of an electrically conductive material, an insulating film is formed on the surface of the supporting member, at least the surface of the fixing member is made of an electrically conductive material and the supporting member and the fixing member are secured in such a manner that an electrical conduction is established between the supporting member and the fixing member and to as well as provide an information processing apparatus.

Another object of the present invention to provide an image sensor comprising two or more independent hollow portions formed in a supporting member, wherein all of optical elements such as illuminating means, imaging means and light receiving device are accommodated in one of the independent hollow portions and at least one of the side plate portions of the hollow portion except for the hollow portion which accommodates the optical elements are opened outside and to as well as provide an image processing apparatus.

Other and further objects, features and advantages of the invention will be appear more fully from the following description.

BRIEF DESCRIPTION OF THE DRAWINGS

FIGS. 3A and 3B are schematic views which illustrates a first embodiment of an image sensor according to the present invention;

FIG. 8 is a schematic view which illustrates a method of covering a gap between a connection cable and a hole;

DETAILED DESCRIPTION OF THE PREFERRED EMBODIMENTS

First Embodiment

Figure 1A:
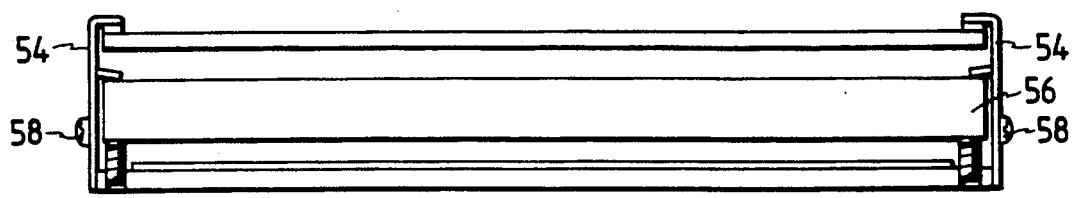
FIGS. 1A and 1B are schematic views which illustrates a conventional image sensor.
Figure 1B:
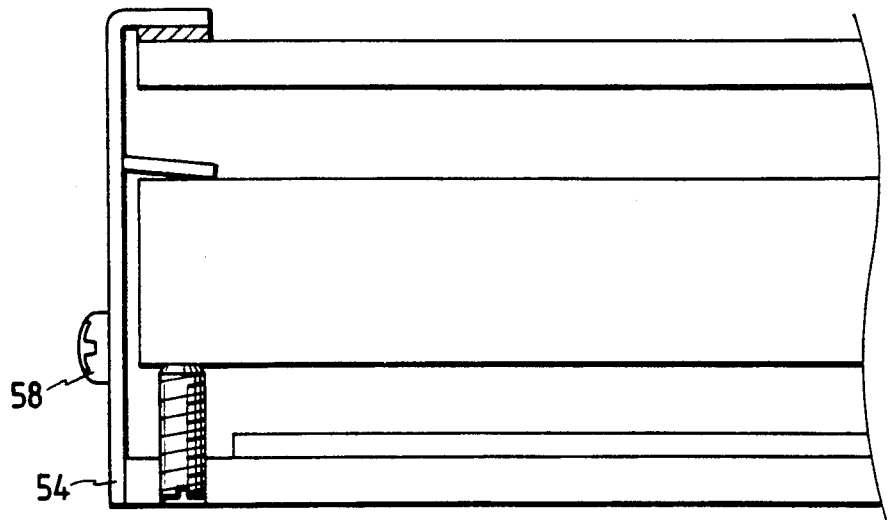
Figure 2:
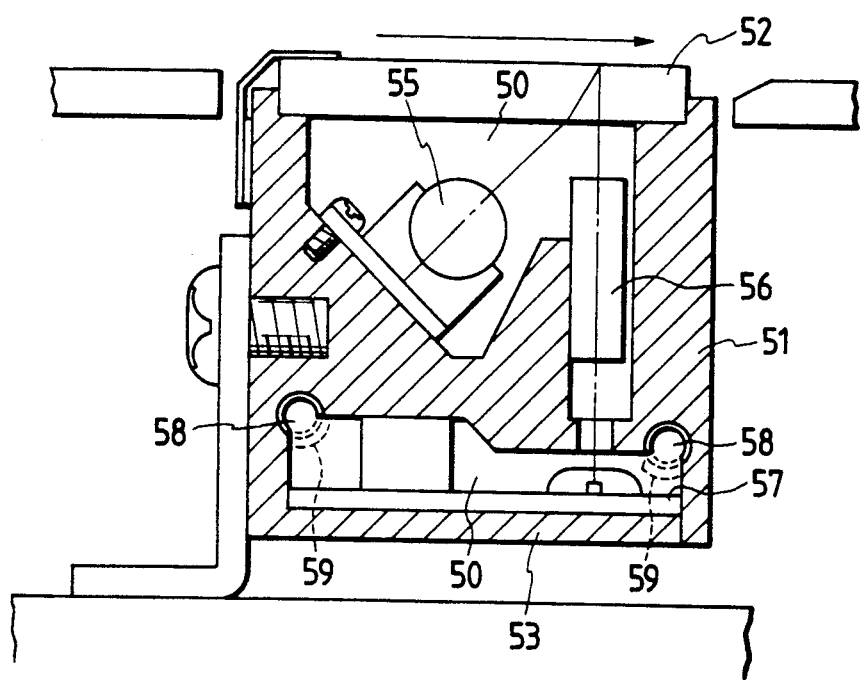
FIG. 2 is a schematic cross sectional view which illustrates the conventional image sensor.
Figure 4:
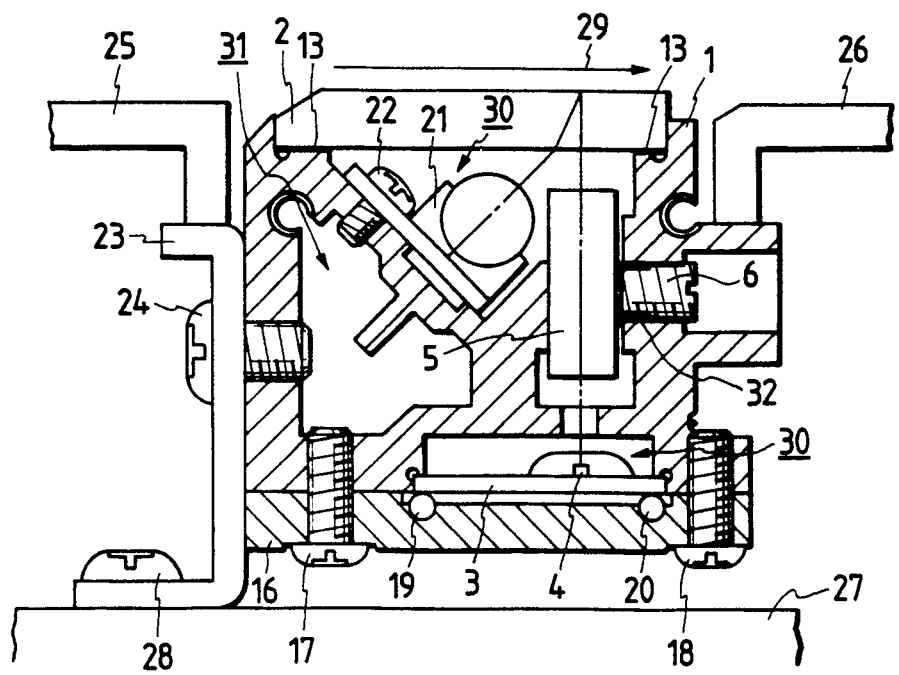
FIG. 4 is a schematic cross sectional view which illustrates the first embodiment of the image sensor according to the present invention.

FIG. 3 is a schematic view which illustrates a first embodiment of a contact type image sensor according to the present invention. FIG. 3A is an overall view of the same and FIG. 3B is an enlarged view which illustrates a portion including a side plate. FIG. 4 is a side elevational schematic cross sectional view which illustrates the contact type image sensor. Referring to FIGS. 3 and 4, reference numeral 1 represents a frame serving as a supporting member, 2 represents a reading glass. A sensor substrate 3 and a sensor device 4 constitute a photoelectrical conversion means. Reference numeral 5 represents a SELFOC lens serving as an imaging means. Reference numerals 6, 7 and 8 represent lens fixing screws, 9 and 10 represent side plates, 11 and 12 represent side plate fixing screws, 13, 14 and 15 represent reading glass adhesion layers, 16 represents a bottom plate and 17 and 18 represent bottom plate fixing screws. Reference numerals 19 and 20 represent sensor substrate fixing rubber shafts, 21 represents an LED array serving as an illuminating means and 22 represents an LED array fixing screw. Reference numeral 23 represents a fastening plate, 24 represents a fastening/fixing screw, 25 represents a fastening plate side original document guide and 26 represents a lens side original document guide. Reference numeral 17 represents an apparatus body, 28 represents a contact type image sensor fixing screw and 29 represents an original document. The basic reading system is composed of a photoelectrical conversion means, an imaging means and an illuminating means.

The frame 1 is formed into the final shape by cutting an extruded aluminum-alloy workpieces and as well as the entire surface of same is subjected to a black alumite treatment in order to prevent an adverse influence upon the internal optical system and undesirable change of the state of the surface thereof.

The reading glass 2 is chamferred on its original document introduction side so as to prevent undesirable catch of the original document.

On the sensor substrate 3, sensor devices 4 such as a photoelectrical conversion device, a photoconductive device, a photoelectromotive device are mounted.

The SELFOC lens 5 is secured to the frame 1 by the lens fixing screws 6, 7 and 8.

The side plates 9 and 10 are made of leaf springs respectively secured to the frame 1 by the corresponding side plate fixing screws 11 and 12.

The reading glass 2 is, by the reading glass adhesion layers 13, 14 and 15, secured to the central portion, the side plates 9 and 10 of the frame 1.

The bottom plate 16 is formed into the final shape by cutting an extruded aluminum-alloy workpiece and as well as the entire surface of same is subjected to a black alumite treatment in order to prevent undesirable change of the state of the surface thereof. Furthermore, the bottom plate 16 is secured to the frame 1 by the bottom plate fixing screws 17 and 18 and as well as the same presses the sensor substrate fixing rubber shafts 19 and 20 secured to the bottom plate 16 by adhesion or the like so that the sensor substrate 3 is fixed by the pressing force.

The LED array 21 is constituted in such a manner that an LED chip, a cylindrical lens and the like are mounted on the substrate and the same is secured to the frame 1 by the LED array fixing screw 22.

The fastening plate 23 is made of sheet metal and the same is fixed to the frame 1 by the fastening plate fixing screw 24. The contact type image sensor is, via the fastening plate 23, secured to the apparatus body 27 by the contact-type image sensor fixing screw 28.

According to this embodiment, the fastening plate side original document guide 25 is formed into a guide plate to smoothly introduce the original document onto the reading glass 2, the fastening plate side orignal document guide 25 being secured to the apparatus body 27.

According to this embodiment, the lens side original document guide 26 is formed into a guide plate to smoothly discharge the original document from the reading glass 2, the lens side original document guide 26 being secured to the apparatus body 27.

The original document 29 is smoothly introduced onto the reading glass 2 along the fastening plate side original document guide 25, while the same is smoothly discharged from the reading glass 2 along the lens side original document guide 26. At this time, the surface of the original document 29 confronting the reading glass 2 is illuminated on the reading glass 2 by a light beam emitted from the LED array 21. As a result, the image of the original document 29 is imaged on the sensor device 4 by the SELFOC lens 5. The image is then photoelectrically converted by the sensor device 4 before it is amplified on the sensor substrate 3 so as to be transmitted to outside of the contact type image sensor.

The frame 1 includes independent space, that is, hollow portions 30 and 31. The hollow portion 30 is a space defined by the frame 1, the reading glass 2, the side plates 9, 10 and the bottom plate 16. The hollow portion 31 is a space defined by the frame 1, the side plates 9 and 10. The hollow portions 30 and 31 are arranged in such a manner that air containing dust or the like cannot substantially freely passes between the two hollow portions 30 and 31.

The hollow portion 30 accommodates all of the essential optical elements such as the sensor substrate 3, the SELFOC lens 5, the bottom plate 16 and the LED array 21.

On the other hand, the hollow portion 31 does not accommodate the optical elements.

All of the screws for use in building up the contact type image sensor except for the lens fixing screws 6, 7 and 8 are arranged in such a manner that their leading portions are positioned outside the contact image sensor or projected into the hollow portion 31. The reason for arranging the screws in the above-described manner lies in that the tapping work can easily be performed, the necessity of improving the dimensional accuracy of the screw length can be eliminated and the introduction of dust generated at the time of tightening the screws into the screw head portion can be prevented. The above-described structure is suitable when the LED array fixing screw 22, the head portion of which projects into the hollow portion 30, is used.

Since the structure is arranged as described above, the leading portion of the screws for use in building up the contact type image sensor, and, more particularly, the same of the screws to be tightened toward the inside portion of the frame 1 and those disposed in the frame 1 do not appear in the hollow portion 30 which accommodates the optical elements. As a result, the undesirable introduction of the chips generated from the tapped portion into the hollow portion 30 can be prevented and thereby the image can be satisfactorily protected from an adverse influence.

According to this embodiment, the SELFOC lens 5 is arranged to be fixed by screws. Therefore, there is a risk of the introduction of the chips generated from the tapped portions of the lens fixing screws 6, 7 and 8 into the hollow portion 30 when the SELFOC lens 5 is secured. Therefore, the tapped portion of the lens fixing screws 6, 7 and 8 or the screws 6, 7 and 8 are applied with an elastic sealant 32 before the SELFOC lens 5 is secured by them. The elastic sealant 32 according to this embodiment is a gap filler such as silicon rubber type filler.

As described above, the elastic sealant 32 is applied to the screws or the tapped portions so that the undesirable introduction of the chips into the hollow portion 30 can be prevented even if the leading portions of the screws appear in the hollow portion 30. Therefore, even if another structure is employed in which the leading portions of the screws except for the screws for fixing the lens for use in building up the contact type image sensor are allowed to appear in the hollow portion 30, the deterioration of the image taken place due to the chips can be prevented. However, it is preferable that the structure be arranged as described above in such a manner that the leading portions of the screws for use in building up the contact type image sensor do not appear in the hollow portion 30 in order to reduce the overall cost by preventing an increase in the number of the manufacturing processes required to apply the elastic sealant 32.

Furthermore, if a structure is employed in such a manner that the SELFOC lens 5 is secured by an adhesive to eliminate the necessity of fixing the SELFOC lens 5 from outside, the above-described problem can be overcome and thereby the elastic sealant 32 can be omitted from the structure.

Figure 5:
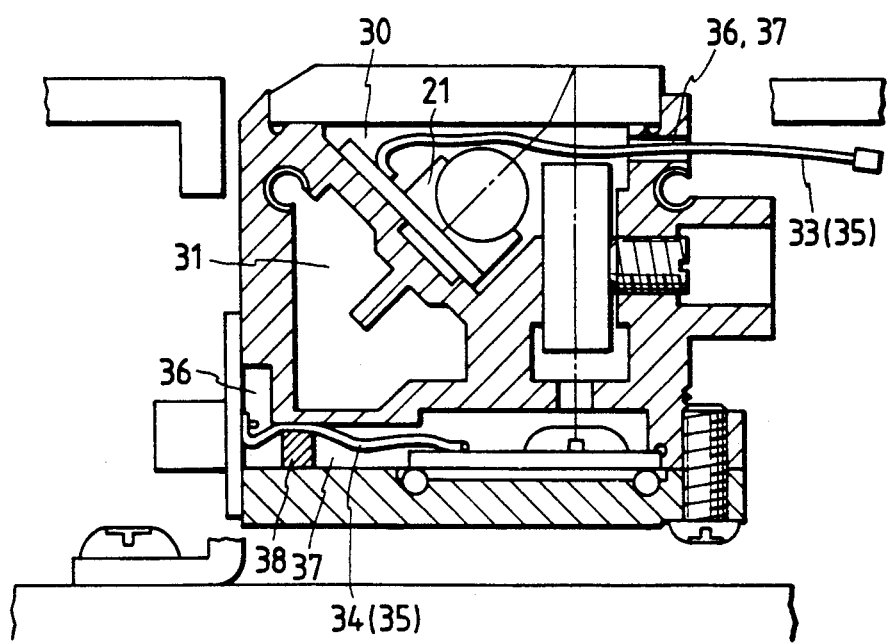
FIGS. 5, 6 and 7 are schematic cross sectional views which illustrate other embodiments of the image sensor according to the present invention.
Figure 6:
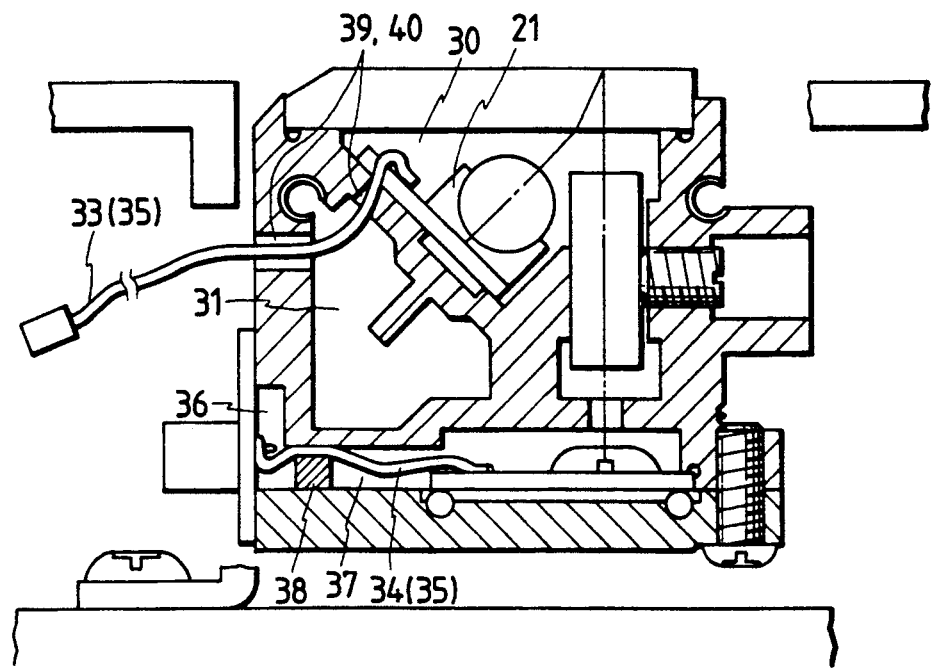
Figure 7:
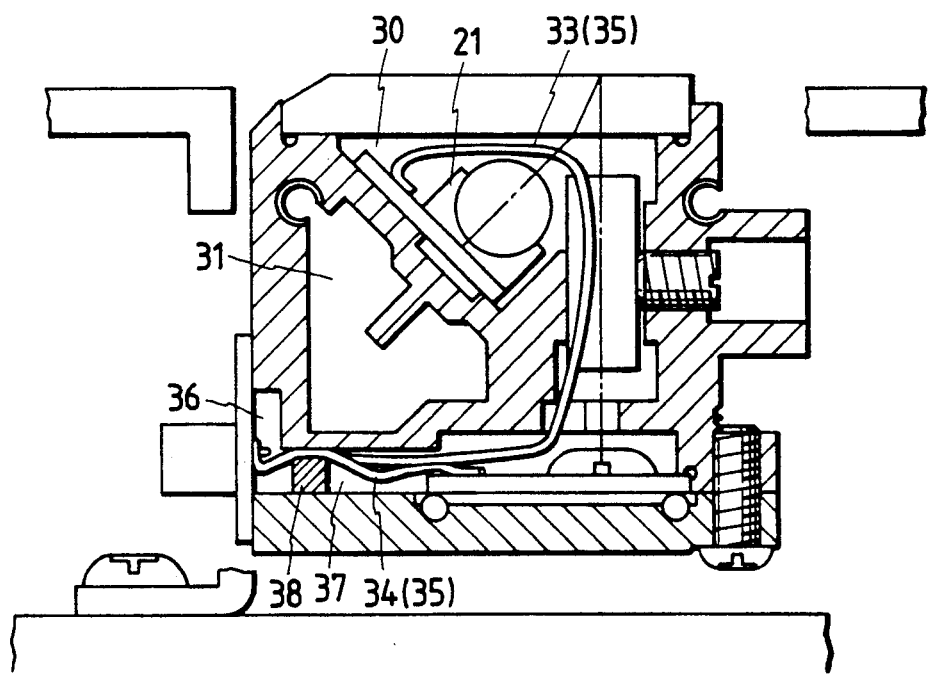

In order to operate the contact type image sensor, the optical elements included by the contact type image sensor and the outer portion of the contact type image sensor must be connected to one another by elements. FIGS. 5, 6 and 7 are perspective views which illustrate a portion including the side plate of the contact type image sensor.

In order to cause the LED array 21 serving as the illuminating means to emit light, electrical energy must be supplied to the LED array 21 from outside. Therefore, electric power is supplied from outside by using an LED power supply cable 33, the LED power supply cable 33 being allowed to comprise an ordinary cable having a circular cross sectional shape. In a case where the illuminating means is arranged to perform the illumination by using, for example, external light in place of the LED array 21, a light supply means such as an optical fiber must be used. Furthermore, electric power, control signals, and read image signals must be transmitted via a sensor substrate cable 34 in order operate the sensor, which is the light receiving device, and outwards transmit a read image information signal. The sensor substrate cable 34 may comprise a flexible substrate or a flat cable.

The above-described elements serving as the connecting members are collectively called a connecting cable 35 hereinafter.

The connecting cable 35 is connected to outside portion of the contact type image sensor after it has passed through holes formed in the frame 1, the side plates 9, 10 and the bottom plate 16 and the like. According to this embodiment, the hole 36 is formed by a groove created by secondarily processing the frame 1 and the side plates 9 and 10 or the bottom plate 16 in order to easily cause the connecting cable 35 to pass through. If there is a gap 37 between the connecting cable 35 and the hole 36, there is a risk of introduction of foreign matter such as chips or dust through the gap 37 into the hollow portion 30 which accommodates the optical elements, causing the image to be adversely influenced. Therefore, it is preferable that the number of the holes 36 be reduced. This will cause another effect to be obtained in that the cost can be reduced since the number of portions which must be subjected to the secondary process can be decreased. The problem of the undesirable introduction of the chips and dust through the gaps 37 between the connecting cables 35 and the holes 36, the number of each of which is reduced can be overcome by sealing the gaps 37 by a sealing member 38.

In order to decrease the number of the holes 36, the structure must be arranged in such a manner that the connecting cable 36 does not pass through the hollow portion 31, which does not accommodate the optical elements but the same directly appear outside from the hollow portion 30. In a case where a plurality of the connecting cables 35 such as the above-described LED power supply cable 33 and the sensor substrate cable 34 are used, a plurality of the cables are collectively pulled out through one hole 36 as illustrated. Thus, the number of the hole 36 can be minimized and thereby the cost can be reduced.

However, there is a case in which the connecting cable 35 must pass through the hollow portion 31 due to the necessity of the internal space depending upon the structure of the contact type image sensor or a direction through which the connecting cable 35 appear outside from the contact type image sensor. In this case, a plurality of holes 39 and 40 through which the connecting cables pass through must be used. However, it is able to prevent the introduction of dust into the hollow portion 30 while eliminating the necessity of increasing the number of the sealing members 38 by providing the sealing members 38 for only the holes 39 which establishes the connection between the two hollow portions 30 and 31. Therefore, the cost can be reduced satisfactorily.

The gap 37 can be sealed by a variety of methods as shown in FIG. 8.

A method designated by symbol 4a may be employed in which the portion around the connecting cable 35 having a circular cross section is surrounded by the sealing member 38. Another method designated by symbol 4b may be employed in which the connecting cable 35 of a flat type is surrounded by the sealing member 38. Another method designate by symbol 4c may be employed in which the connecting cable 35 having a circular cross section is brought into contact with either side of the hole 36 and the residual space is filled with the sealing member 38.

Another method designated by symbol 4d may be employed in which the flat type connecting cable 35 is brought into contact with either side of the hole 36 and the residual space is filled with the sealing member 38. Another method may be employed in which a plurality of the connecting cable 35 each having a circular cross section are provided. Another method may be employed in which the connecting cable 35 having a circular cross section and the flat type connecting cable 35 are combined with each other.

In a case where the hole 36 is not disposed between the two elements, the shape becomes as designated by symbol 4g.

The present invention is not limited to the above-described methods of sealing the gap 37. They may be arbitrarily combined with each other or the shape may be modified. In addition, the number of the connecting cables 35 is not limited particularly. Furthermore, it is preferable that the sealing member 38 be made of an elastic sealant or an elastic material such as rubber and formed by injection molding. However, material which is hardened after the solidification such as an adhesive may be employed.

Although the above-described embodiment is arranged in such a manner that the two independent hollow portions are formed in the contact type image sensor, it may be modified properly within the scope of the present invention. For example, three or more hollow portions may be formed.

It is preferable that the optical sensor 4 comprises an elongated optical sensor of the type which is composed of amorphous silicone and which is disclosed in U.S. Pat. No. 4,461,956 granted to Hatanaka and the like; the inventor of the present invention because its cost can be reduced and an excellent resolution can be obtained.

Also an optical sensor of a type disclosed in U.S. Pat. No. 4,791,469 granted to Omi; the inventor of the present invention or that disclosed in U.S. Pat. No. 4,810,896 granted to Tanaka; the inventor of the present invention may be employed which is arranged in such a manner that a capacity load is provided for the emitter of a bipolar transistor and an output signal is read by means of voltage. In this case, a plurality of sensor chips are straight or in a zigzag manner disposed on the surface of the ceramic substrate and the same is subjected to passivation by silicone resin or the like.

Figure 9:
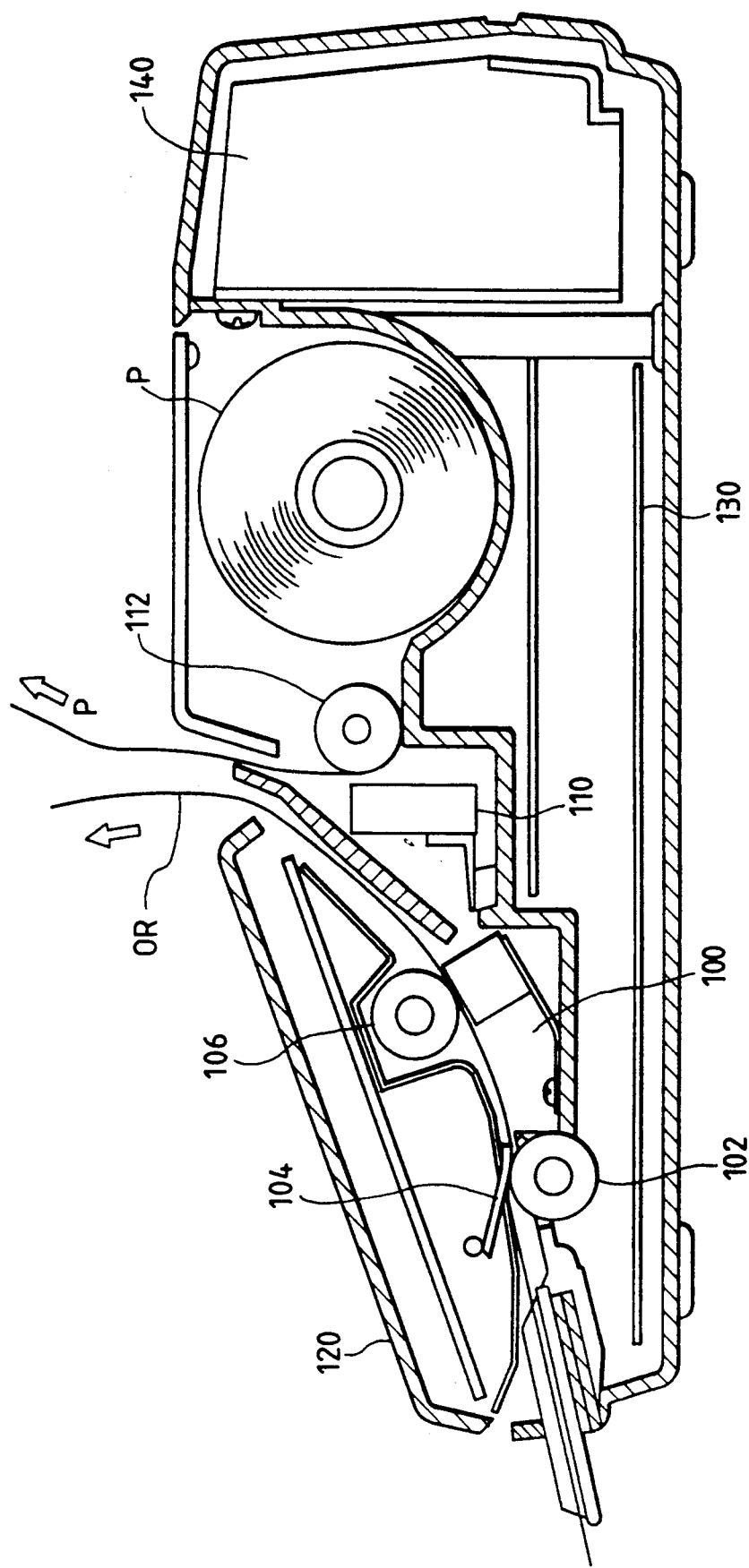
FIG. 9 is a schematic cross sectional view which illustrates an information processing apparatus according to the present invention.

FIG. 9 illustrates an example of a facsimile machine serving as an image information apparatus constituted by using the sensor unit according to this embodiment and having a communication function. Referring to FIG. 9, reference numeral 102 represents a supplying roller serving as a supply means for supplying original document OR toward a reading position. Reference numeral 104 represents a separating member for assuredly and one by one separating and supplying the original document OR. Reference numeral 106 represents a platen roller serving as a conveying means disposed at the reading position with respect to the sensor unit and arranged to restrict the surface of the original document OR to be read and as well as convey the original document OR.

Symbol P represents a recording medium formed into a roll of paper in which image information transmitted from outside is reproduced in a case of image information read by the sensor unit or in a case of a facsimile machine. Reference numeral 110 represents a recording head serving as a recording means for forming the above-described image, the recording head being allowed to comprise a variety of heads such as a thermal head and an ink jet recording head. The recording head according to this embodiment may comprise a serial type recording head or line type recording head. Reference numeral 112 represents a platen roller serving as a conveying means for conveying the recording medium P to the recording position made by the recording head 110 and as well as restricting the surface of the recording medium P to be recorded.

Reference numeral 120 represents an operation panel serving as an input/output means on which switches for receiving operational inputs and display portions for displaying messages and information about the states of the apparatus are disposed.

Reference numeral 130 represents a system control substrate serving as a control means and comprising a control portion (controller) for controlling the operation of each unit, a drive circuit (driver) for driving the photoelectrical conversion device, a processing portion (processor) for processing image information and information transmitting/receiving portion and the like. Reference numeral 140 represents a power source for the apparatus.

It is preferable that the recording means for use in the information processing apparatus according to the present invention comprises a means the representative structure and the principle of which have been disclosed in U.S. Pat. No. 4,723,129 or U.S. Pat. No. 4,740,796. According to these disclosures, one or more drive signals which correspond to information to be recorded and which cause a rapid temperature rise exceeding nuclear boiling are supplied to an electrothermal converter which is disposed to correspond to a sheet or a liquid passage in which liquid (ink) is held. As a result, thermal energy is generated in the electrothermal converter, causing film boiling to be generated in the heat effective surface of the recording head. Consequently, bubbles can be formed in liquid (ink), one by one, corresponding to the drive signals, causing a significant effect to be obtained. When the bubbles are enlarged/contracted, liquid (ink) is discharged through discharge apertures so that one or more droplet are formed.

Furthermore, in a case where the recording head is a full line type recording head having a length which corresponds to the maximum width of the recording medium which can be recorded by the recording apparatus, a structure may be employed in which a plurality of recording heads disclosed in the above-described disclosures are combined with each other to correspond to the above-described length. Another structure may be employed which has a single recording head constituted by integrating a plurality of heads.

Furthermore, the present invention can be effectively adapted to an interchangeable chip-type recording head which is arranged in such a manner that, when it is mounted on the apparatus body, an electrical connection with the apparatus body or ink supplied from the apparatus body can be enabled. In addition, the present invention can be effectively adapted to a cartridge type recording head in which an ink tank is integrally provided for the body of the recording head.

As described above, according to this embodiment, a contact type image sensor is arranged in such a manner that two or more independent hollow portions are formed in the frame and all of the optical elements such as the illuminating means, the imaging means and the light receiving devices and the like are accommodated in one of the hollow portions. The leading portions of the screws do not appear in the accommodating portion which accommodates the optical elements at the time of assembling the contact type image sensor. Therefore, the deterioration in the image quality can be prevented, the deterioration being due to the introduction of the chip generated in the tapping operation into the accommodating portion which accommodates the optical elements.

Second Embodiment

Figure 10A:
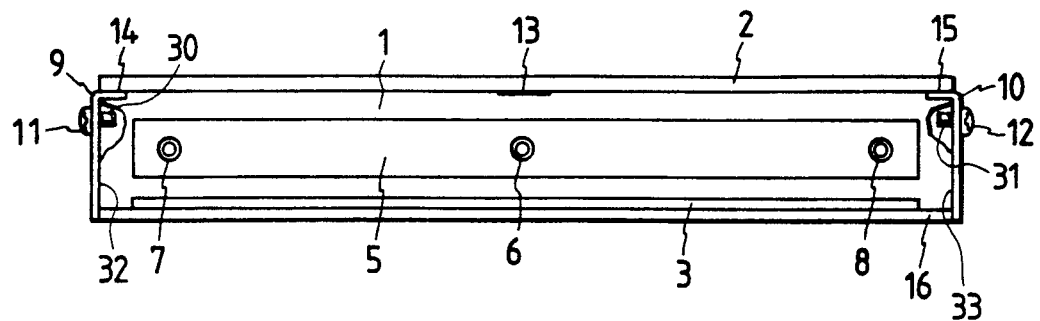
FIG. 10A is a front elevational view which illustrates a second embodiment of the image sensor according to the present invention.
Figure 10B:
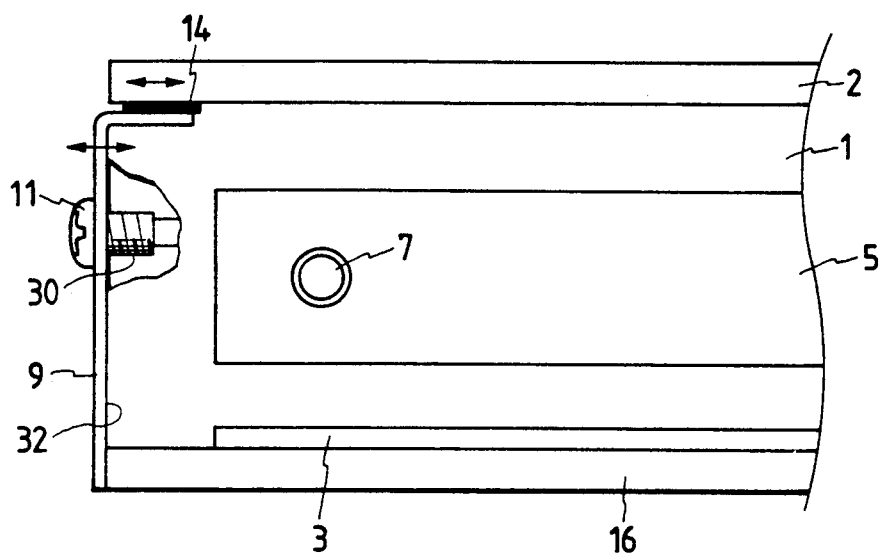
FIG. 10B is an enlarged front elevational view which illustrates an essential portion of the same.
Figure 11:
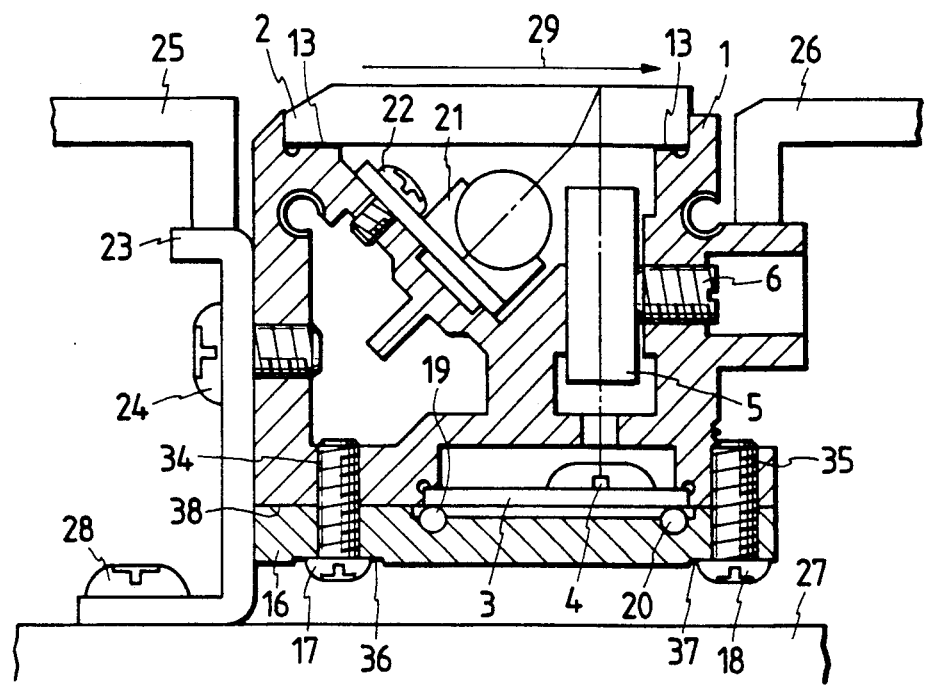
FIG. 11 is a schematic cross sectional view which illustrates the second embodiment of the image sensor according to the present invention.

Referring to FIGS. 10A, 10B and 11, reference numeral 1 represents a frame of a contact type image sensor to which the following elements are fastened: a reading glass 2, a sensor substrate 3 having a sensor device 4 serving as the light receiving device, a SELFOC lens 5 serving as an imaging means, side plates 9, 10 and a bottom plate 16 which are secured to the above-described frame 1 and an LED array 21 serving as the illuminating means. According to this embodiment, the above-described SELFOC lens 5 is secured by lens fixing screws 6, 7 and 8, while the side plates 9 and 10 are secured by side plate fixing screws 11 and 12. In addition, the bottom plate 16 is secured by bottom plate fixing screws 17 and 18. The sensor substrate 3 is, via sensor substrate fixing rubber shafts 19 and 20, held between the frame 1 and the bottom plate 16. In addition, the LED array 21 is secured by an LED array fixing screw 22. The frame 1 is secured to a fastening plate 23 by a fastening plate fixing screw 24, while the fastening plate 23 is secured to an apparatus body 27 by a contact-type image sensor fixing screw 28. Reference numeral 25 represents a fastening plate side original document guide, 26 represents a lens side original document guide and 29 represents an original document.

The above-described frame 1 is formed into its final shape by subjecting an extruded aluminum workpiece to a secondary machining such as a cutting work. In order to prevent the adverse influence upon the internal optical system and preventing the surface oxidation, it subjected to the black alumite treatment. As a result, a non-conductive film is formed on the surface of the frame 1.

The reading glass 2 is chamfered on its original document introduction side so as to prevent the undesirable check of the original document. The side plates 9 and 10 comprise leaf springs made of stainless steel, each of the side plates 9 and 10 being secured to the frame 1 by the side plate fixing screws 11 and 12. The reading glass 2 is secured to the central portion of the frame 1, the side plates 9 and 10 via the reading glass adhesion layers 13, 14 and 15. The bottom plate 16 is formed into its final shape by cutting the extruded aluminum workpiece and the same is subjected to the alumite treatment in order to prevent the change in the surface condition such as oxidation.

The LED array 21 has a substrate on which an LED chip, a cylindrical lens and the like are mounted. The fastening plate 23 is a steel sheet which is applied with a surface treatment such as nickel plating, tin plating, aluminum plate or the like exhibiting excellent high frequency conductivity in order to prevent the surface condition change such as oxidation and as well as to improve the electrical conductivity.

According to this embodiment, the fastening plate side original document guide 25 serves as a guide plate for smoothly introducing the original document onto the surface of the reading glass 2, the fastening plate side original document guide 25 being secured to the apparatus body 27. The above-described lens side original document guide 26 is, according to this embodiment, arranged to be a guide plate for smoothly discharging the original document from the reading glass 2, the lens side original document guide being secured to the apparatus body 27.

The original document 29 is smoothly introduced onto the surface of the reading glass 2 along the fastening plate side original document guide 25, while the same is discharged from the reading glass 2 along the lens side original document guide 26. At this time, the surface of the original document 29 confronting the reading glass 2 is, on the reading glass 2, illuminated by the light beams emitted from the LED array. As a result, an image written on the original document 29 is imaged on the sensor device 4 by the SELFOC lens 5. Thus, the image is photoelectrically converted by the sensor device 4 before it is amplified on the sensor substrate 3 so as to be transmitted outside of the contact type image sensor.

Figure 12A:
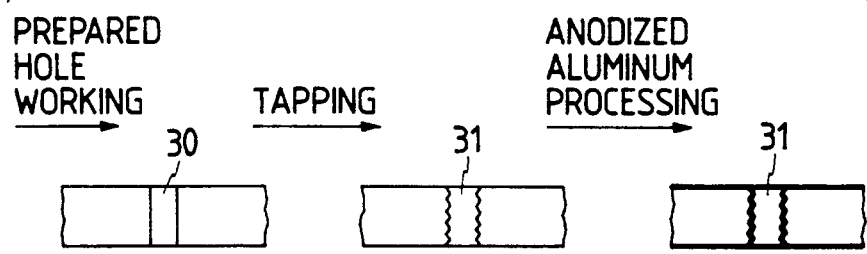
FIG. 12A is a schematic view which illustrates the sequential order of an alumite treatment process.
Figure 12B:
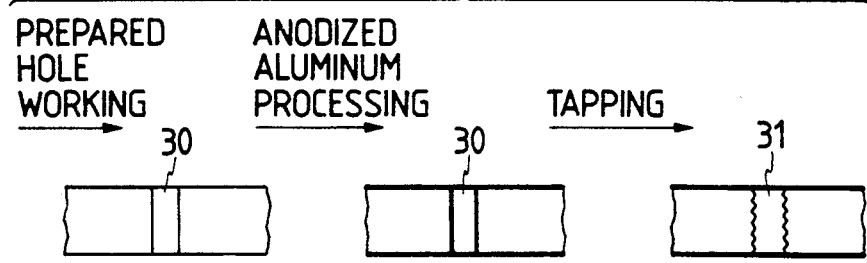
FIG. 12B is a schematic view which illustrates the sequential order of a tapping process.

Since the above-described side plates 9 and 10 are made of stainless steel and thereby they exhibit electrical conductivity. Also the side plate fixing screws 11 and 12 for fixing the side plates 9 and 10 to the frame 1 are made of steel and the same is applied with nickel plating which exhibits excellent electrical conductivity. Since the primary hole 30 for tapping and a thread hole 31 are usually formed in the frame 1 before the alumite treatment is performed, the electrically conductive state is not realized even if screws are directly fastened. According to this embodiment, the tapping primary hole 30 is formed in the frame 1 as shown in FIG. 12B before the alumite treatment is performed. Then, tapping of the frame 1 is performed so that the alumite film is removed in the thread hole 31. As described above, according to this embodiment, an effect can be obtained in that the overall cost can be reduced because the tapping process is arranged to be performed after the alumite treatment in order to establish the electrical conduction.

Figure 13:
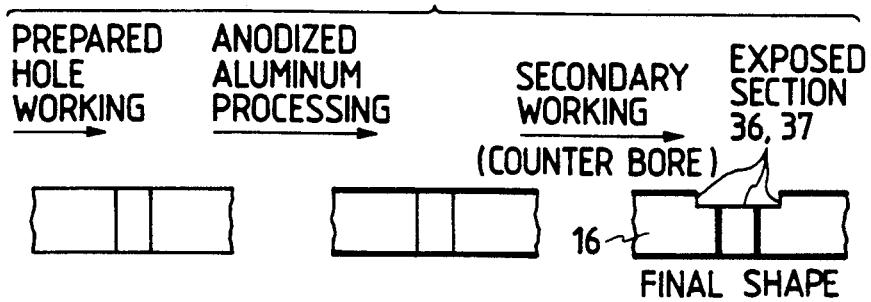
FIG. 13 is a scheamtic view which illustrates a sequential order of a process of causing the basic surface which is not applied with an alumite coating to appear.
Figure 14:
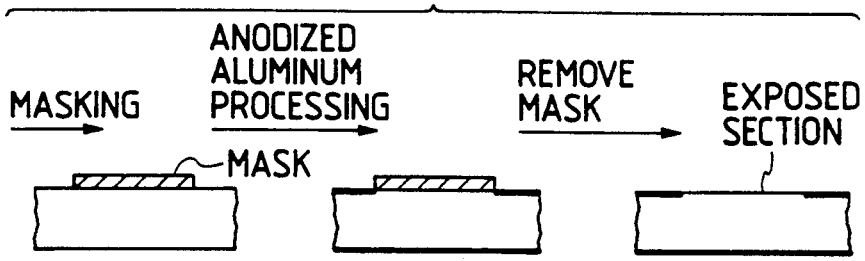
FIG. 14 is a schematic view which illustrates another sequential order of a process of causing the basic surface which is not applied with an alumite coating to appear.

When screw fixing is performed as described above, an electrical conduction can be established between the frame 1 and the side plates via the side plate fixing screws 11 and 12. If the degree of the electrical conduction established by the side plate fixing screws 11 and 12 is insufficient, the electrically conductive area can be increased by additionally establishing the electrical conduction between the frame 1 and the side plates 9 and 10 via contact surfaces 32 and 33. In this case, the surface of the frame 1 must be arranged in such a manner that the base surface having electrical conductivity must appear in place of the alumite film. The base surface can be allowed to appear outside by the following means:

A means shown in FIG. 13 is arranged in such a manner that the frame 1 is first subjected to the alumite treatment before the alumite film is removed in the required portions by a secondary machining. The above-described secondary machining process may comprise a milling process. Furthermore, the removal of the alumite film by tapping as described above is a kind of the secondary machining process.

The above-described machining is characterized by a fact that the shape of the portion in which the base surface is caused to appear outside is changed. Therefore, if the base surface of the subject portion can be caused to appear outside by another secondary machining process performed for another purpose, any special process for causing the base surface to appear outside according to the present invention can be omitted.

A means shown in FIG. 4 is arranged in such a manner that no alumite film is formed in the required portions at the time of the alumite treatment. That is, masking is previously applied to the portion of the frame 1 the base surface of which must appear outside. Then, the mask is removed after the alumite treatment has been completed. As a result, the base surface of the required portion, to which no alumite treatment is applied, appear outside. The above-described masking process is performed by applying a resist or by using a masking tape each of which is not influenced by the alumite treatment.

The above-described machining is characterized in that the shape of the portion, the base surface of which is caused to appear outside, is not changed. Furthermore, an excellent effect can be obtained if it is used to cause a wide area to appear outside.

In any of the above-described machining means, an excellent effect can be obtained in the portion which receives pressure at the time of tightening the screw. That is, the portion around the tapped portion according to this embodiment. It is preferable that the exposed area be wide within the contact surface, more preferably, an area larger than the screw seat contact area.

According to this embodiment, since the bottom plate 16 is made of an aluminum alloy similarly to the frame 1, therefore there is no electrical conductivity. In this case, the bottom plate fixing screws 17 and 18 are, similarly to the above-described structure, made of steel and as well as applied with the nickel plating which exhibits excellent electrical conductivity. Furthermore, the frame 1 is subjected to the alumite treatment after the tapping primary hole has been formed therein. Then, tapping of the tapping primary hole is performed. As a result, the alumite film on the frame 1 is removed in the tapped portions 34 and 35. As for the contact between the bottom plate 16 and the seating surfaces of the bottom plate fixing screws 17 and 18, counterboring(reference numerals 36 and 37) is performed in the bottom plate 16 after the overall alumite treatment has been performed in order to cause the base surface to appear outside. As a result, an electrical conduction is established between the frame 1 and the bottom plate 16 via the seating surface contact portions 36 and 37 of the bottom plate fixing screws 17 and 18 and the tapping portions 34 and 35. If the necessity of shinking the head portions of the bottom plate fixing screws 17 and 18 into the bottom plate 16 can be eliminated, a masking treatment applied to the subject portion to cause the base surface to appear outside later is employed in place of the counterboring so as to establish the electrical conduction.

In a case where the conductivity established by the bottom plate fixing screws 17 and 18 is insufficient, another electrical conduction is established between the bottom plate 16 and the contact surface 38 to increase the electrically conductive area. In this case, the surface at which the frame 1 and the bottom plate are positioned in contact with each other must be arranged in such a manner that its base surface having electrical conductivity must appear outside by removing the alumite film.

As described above, any one of the above-described means may be employed to cause the base surface to appear outside. An excellent effect can be obtained from the fact that the base surface appears outside in he portion which receives the pressure at the time of tightening the screw. Also according to this embodiment, it is preferable that the exposure range be wide within the contact surface. According to this embodiment, the surface of the fastening plate 23 has electrical conductivity. The means for fastening the fastening plate 23 to the frame 1 is arranged to be similar to the above-described embodiment. The lens fixing screws 6, 7 and 8 for securing elements having no electrical conductivity may be subjected to proper machining/processing order in terms of convenience in manufacturing the contact type image sensor because the sequential order of the non-conductive film forming process and the tapping process may be arbitrarily determined.

According to the above-described embodiments, the side plates are made of stainless steel, the screws are made of steel and the fastening plate is made of a steel plate applied with electrically conductive plating. However, the above-described material may be changed if the surface of the element has the electrical conductivity. For example, the side plate may be made of a steel plate applied with electrically conductive plating and the screws and the fastening plate respectively may be made of stainless steel. As an alternative to this, they may be made of copper or another metal material. Furthermore, a plastic material possessing electrical conductivity because copper dust or carbon dust are mixed may be employed. In addition, a non-conductive plastic applied with electrical conductive plating such as nickel plating may be employed.

Furthermore, the frame may be made of any electrical conductive material in place of the aluminum alloy. In addition, the film on the surface may be formed by another method in place of the alumite treatment if the film is non-conductive.

As described above, according to the present invention, the contact type image sensor is arranged in such a manner that the frame made of an electrical conductive material coated with non-conductive film is employed while arranging the structure in such a manner that an electrical conduction is established between the frame and the members to be fastened to the frame. As a result, electric waves generated in the sensor substrate at the time of the operation of the contact type image sensor can be confined by the frame, the bottom plate, the side plates and the like. Furthermore, generation of the antenna effect can be prevented, causing outward leakage of electric waves to be prevented. Therefore, the radiant noise characteristics will not be deteriorated. Because of the same reason, introduction of external electric wave into the contact type image sensor can be satisfactorily prevented. Therefore, the risk of the unstable operation of the contact type image sensor due to the introduced external electric wave can be overcome.

Third Embodiment

Figure 15:
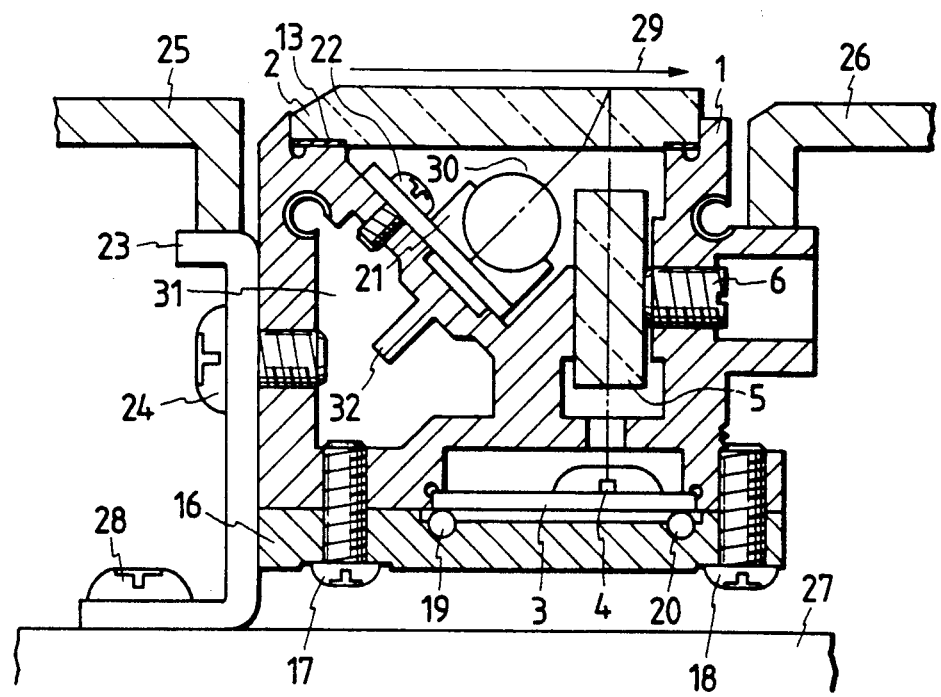
FIG. 15 is a schematic cross sectional view which illustrates a third embodiment of the image sensor according to the present invention.

FIG. 15 is a horizontal perspective view which illustrates an embodiment of an original document reading apparatus according to the present invention.

Figure 16A:
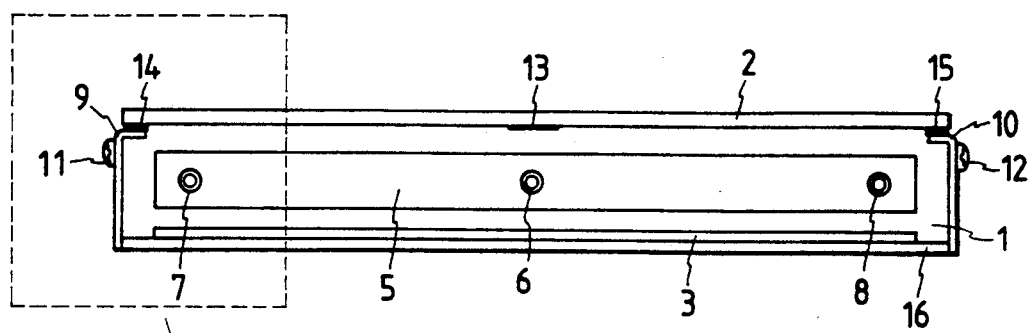
FIGS. 16A and 16B are schematic views which illustrates the third embodiment of the image sensor according to the present invention.
Figure 16B:
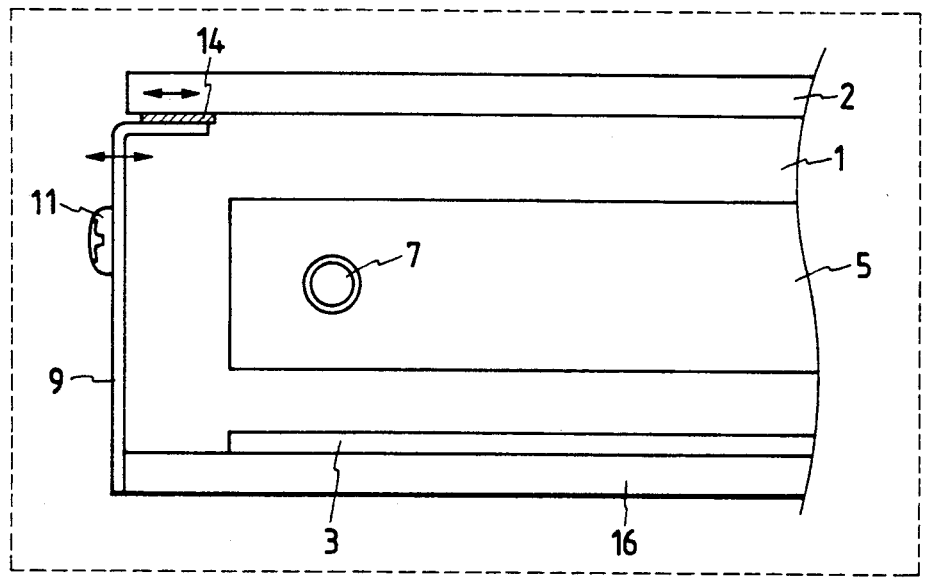

FIG. 16 is a perspective view which illustrates an embodiment of the original document reading apparatus according to the present invention, FIG. 16A is an overall view and FIG. 16B is an enlarged view which illustrates a portion including the side plate.

Referring to FIGS. 15 and 16, reference numeral 1 represents a frame, 2 represents a reading glass, 3 represents a sensor substrate, 4 represents a sensor device, 5 represents a short focal point imaging device array, 6, 7 and 8 represent lens fixing screws, 9 and 10 represent side plates, 11 and 12 represent side plate fixing screws, 13, 14 and 15 represent reading glass adhesion layers, 16 represents a bottom plate, 17 and 18 represent bottom plate fixing screws, 19 and 20 represent sensor substrate fixing rubber shafts, 21 represents an LED array, 22 represents an LED array fixing screw, 23 represents a fastening plate, 24 represents a fastening plate fixing screw, 25 represents a fastening plate side original document guide, 26 represents a lens side original document guide, 27 represents an apparatus body, 28 represents an orginal document reading apparatus fixing screw and 29 represents an original document.

The frame 1 is formed by cutting an extruded aluminum-alloy workpiece and as well as the surface of same is subjected to a black alumite treatment in order to prevent an adverse influence upon the internal optical system and undesirable change of the state of the surface thereof.

The reading glass 2 is chamferred on its original document introduction side so as to prevent undesirable catch of the original document.

On the sensor substrate 3, sensor devices 4 are mounted.

The short focal point imaging device array 5 is secured to the frame 1 by the lens fixing screws 6, 7 and 8.

The side plates 9 and 10 are made of leaf springs respectively secured to the frame 1 by the corresponding side plate fixing screws 11 and 12.

The reading glass 2 is, by the reading glass adhesion layers 13, 14 and 15, secured to the central portion, the side plates 9 and 10 of the frame 1.

The bottom plate 16 is formed by cutting an extruded aluminum-alloy workpiece and as well as the surface of same is subjected to a black alumite treatment in order to prevent undesirable change of the state of the surface thereof. Furthermore, the bottom plate 16 is secured to the frame 1 by the bottom plate fixing screws 17 and 18 and as well as the same presses the sensor substrate fixing rubber shafts 19 and 20 secured to the bottom plate 16 by adhesion or the like so that the sensor substrate 3 is fixed by the pressing force.

The LED array 21 is constituted in such a manner that an LED chip, a cylindrical lens and the like are mounted on the substrate and the same is secured to the frame 1 by the LED array fixing screw 22.

The fastening plate 23 is made of sheet metal and the same is fixed to the frame 1 by the fastening plate fixing screw 24. The original document reading apparatus is, via the fastening plate 23, secured to the apparatus body 27 by the original document reading apparatus fixing screw 28.

According to this embodiment, the fastening plate side original document guide 25 is formed into a guide plate to smoothly introduce the original document onto the reading glass 2, the fastening plate side original document guide 25 being secured to the apparatus body 27.

According to this embodiment, the lens side original document guide 26 is formed into a guide plate to smoothly discharge the original document from the reading glass 2, the lens side original document guide 26 being secured to the apparatus body 27.

The original document 29 is smoothly introduced onto the reading glass 2 along the fastening plate side original document guide 25, while the same is smoothly discharged from the reading glass 2 along the lens side original document guide 26. At this time, the surface of the original document 29 confronting the reading glass 2 is illuminated on the reading glass 2 by a light beam emitted from the LED array 21. As a result, the image of the original document 27 is imaged on the sensor device 4 by the short focal point imaging device 5. The image is then photoelectrically converted by the sensor device 4 before it is amplified on the sensor substrate 3 so as to be transmitted to outside of the original document reading apparatus.

The frame 1 includes independent spaces, that is, hollow portions 30 and 31. The hollow portion 30 is a hollow space A claimed and defined by the frame 1, the reading glass 2, the side plates 9, 10 and the bottom plate 16. The hollow portion 31 is a space B claimed and defined by the frame 1, the side plates 9 and 10. The hollow portions 30 and 31 are arranged in such a manner that they are formed into independent spaces so that air is not flow between the two hollow portions 30 and 31.

The hollow portion 30 accommodates all of the optical elements such as the sensor substrate 3, the short focal point imaging device array 5, the bottom plate 16 and the LED array 21.

Figure 17A:
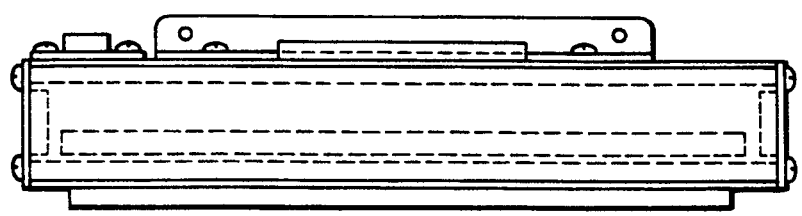
FIGS. 17A and 17B schematic views which illustrates the third embodiment of the image sensor according to the present invention.
Figure 17B:
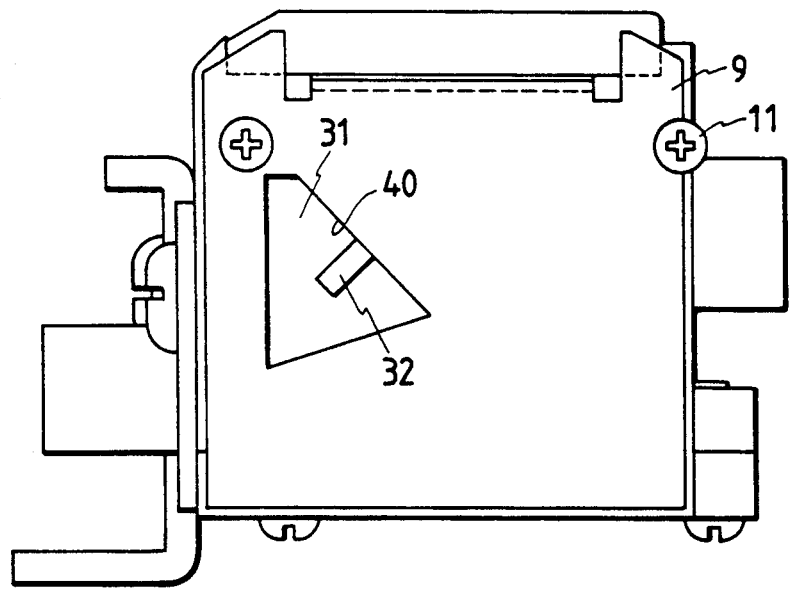

On the other hand, the hollow portion 31 does not accommodate the optical elements. Furthermore, a duct hole 40 is, as shown in FIG. 17, formed in each of the side plates 9 and 10 corresponding to the hollow portion 30. Therefore, the hollow portion 31 is opened outwards at only the side plates 9 and 10. As a result of the arrangement of the structure thus made, the necessity of forming the duct portion for cooling the frame by the secondary machining can be eliminated. Therefore, the rise in the cost can be prevented.

The hollow portion 31 is disposed on the reverse side adjacent to the LED array 21. Since the hollow portion 31 is formed at the above-described position and air is supplied, the portion adjacent to the LED array 21, which is the heat generation source, can directly be cooled by the air supplied so that an excellent cooling effect can be obtained.

Since the reverse side portion of the hollow portion 31 adjacent to the LED array 21 displays the highest temperature in the hollow portion 31, a radiation fin 32 formed into a rib is disposed at this position, causing an excellent cooling effect to be obtained. Since the radiation fin 32 can be manufactured simultaneously with the extrusion process, the cost can be reduced.

Figure 18:
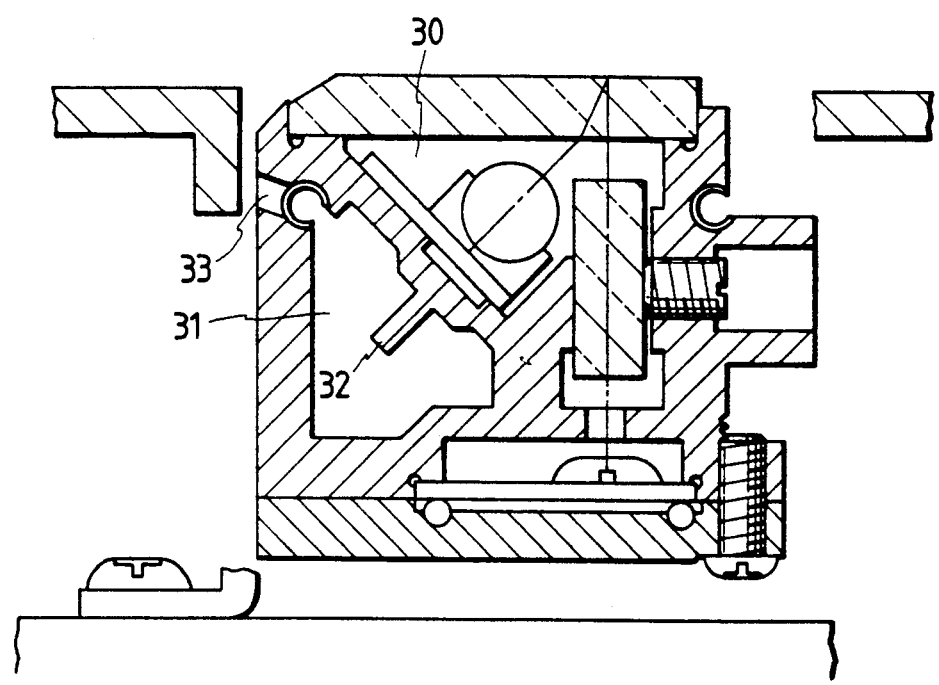
FIG. 18 is a schematic view which illustrates another embodiment of the image sensor according to the present invention.

Furthermore, the duct portion 33 can be provided for the frame 1 at the time of the extrusion process as shown in FIG. 18.

Although the above-described embodiment is arranged in such a manner that two independent hollow portions are formed in the original document reading apparatus, three or more hollow portions may be formed. Furthermore, a plurality of the radiation fins may be provided.

As described above, the original document reading apparatus is arranged in such a manner that two or more independent hollow portions are formed in the frame, all of the optical elements such as the illuminating means, the imaging means and the light receiving device are accommodated in one of the independent hollow portion and the at least one side plate portion of the hollow portion except for the above-described hollow portion which accommodates the optical elements is opened to be supplied with air. Therefore, the following effects can be obtained:

(1) Since the inside portion of the original document reading apparatus can be directly cooled, an excellent cooling efficiency can be realized.

(2) Since the inside portion of the original document reading apparatus can be cooled by using no filter, the cost can be reduced.

(3) Since no filter is used, the air resistance can be reduced and thereby air supply can easily be performed.

(4) Since the hollow portion which can be supplied with air and thereby cooled can be disposed adjacent to the illuminating portion which is the heat generation portion, an excellent cooling effect can be obtained.

(5) By providing the radiation fin, the cooling effect can further be improved.

(6) Since the shape required to perform cooling can be formed without the secondary machining, the cost rise can be prevented.

Figure 19A:
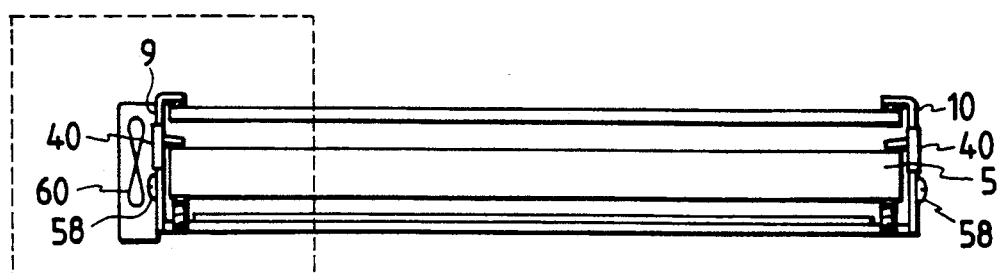
FIGS. 19A and 19B schematic views which illustrates another embodiment of the image sensor according to the present invention.
Figure 19B:
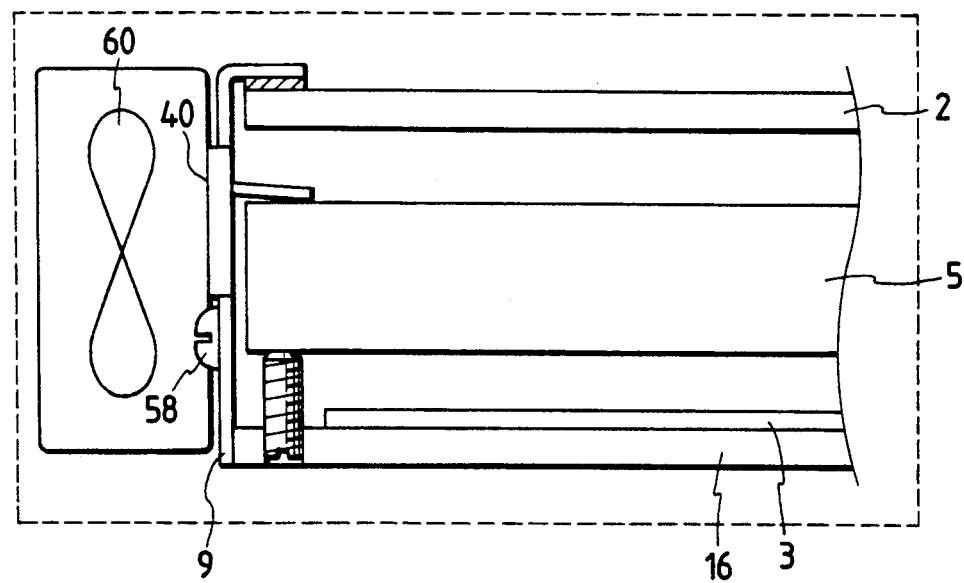

FIG. 19 is a modification of the above-described third embodiment in which a fan 60 is disposed on either side surface to correspond to a duct port 40.

Cooling air sent by the fan 60 is introduced into the hollow portion in the frame through the duct port 40 formed in the side plate 9 before it is discharged outside through the duct port 40 formed in the side plate 10.

The above-described image sensor is, similarly to the first embodiment, mounted on the image information processing apparatus shown in FIG. 9.

Although the invention has been described in its preferred form with a certain degree of particularly, it is understood that the present disclosure of the preferred form has been charged in the details of construction and the combination and arrangement of parts may be resorted to without departing from the spirit and the scope of the invention as hereinafter claimed.

What is claimed is:

1. An image sensor having a supporting member for integrally supporting a reading system which includes illuminating means or illuminating an original document, a photoelectric converting means, and imaging means for imaging light reflected by the surface of said original document onto said photoelectric converting means, said image sensor also having a member disposed on a side surface of said supporting member, said image sensor comprising:

two or more substantially independent spaces formed in said supporting member, wherein
said illuminating means, said imaging means, and said photoelectric converting means are disposed in only one of said spaces, and wherein screws for use in assembling said image sensor are arranged in such a manner that at least the leading portions of said screws appear outside of said space housing said illuminating means, said imaging means, and said photoelectric converting means.

2. An image sensor according to claim 1, wherein a connecting member, for electrically connecting said image sensor and an information processing apparatus on which said image sensor is mounted, is disposed at a position at which the connecting member passes through only said space in which said illuminating means, said imaging means, and said photoelectric converting means are disposed.

3. An image sensor according to claim 2 wherein said connecting member is a member for supplying required energy to said illuminating means and/or said photoelectric converting means.

4. An image sensor according to claim 2 wherein said connecting member is a member for transmitting an image signal transmitted from said photoelectric converting means.

5. An image sensor having a supporting member for integrally supporting a reading system which includes illuminating means for illuminating an original document, a photoelectric converting means, and imaging means for imaging light reflected by the surface of said original document onto said photoelectric converting means, said image sensor also having a member disposed on a side surface of said supporting member, said image sensor comprising;

two or more substantially independent spaces formed in said supporting member, and wherein said illuminating means, said imaging means, and said photoelectric converting means are disposed in only one of said spaces; and screws for use in assembling said image sensor, wherein at least the leading portions of all of said screws, except for those screws used for fixing said imaging means, appear outside of said image sensor or outside of said space in which said illuminating means, said imaging means, and said photoelectric converting means are disposed.

6. An image sensor according to claim 5, wherein elastic sealing members are respectively disposed between said screw for fixing said imaging means and a tapped portion of said screw, and between the said screw and said imaging means to secure them.

7. An image sensor according to claim 5, wherein a connecting member, for electrically connecting said image sensor and an information processing apparatus on which said image sensor is mounted, is disposed at a position at which the connecting member passes through only said space in which said illuminating means, said imaging means, and said photoelectric converting means are disposed.

8. An image sensor according to claim 7, wherein said connecting member is a member for supplying required energy to said illuminating means and/or said photoelectric converting means.

9. An image sensor according to claim 7 wherein said connecting member is a member for transmitting an image signal transmitted from said photoelectric converting means.

10. An image sensor having a supporting member for integrally supporting a reading system which includes illuminating means for illuminating an original document, a photoelectric converting means, and imaging means for imaging light reflected by the surface of said original document onto said photoelectric converting means, said image sensor also having a member disposed on a side surface of said supporting member, said image sensor comprising:

two or more substantially independent spaces formed in said supporting member, and wherein said illuminating means, said imaging means, and said photoelectric converting means are disposed in only one of said spaces; and at least one connecting member, for connecting said image sensor and an information processing apparatus, which passes through at least two of said spaces via a hole in said supporting member, on which said image sensor is mounted, and appears outside of said image sensor via said supporting member and wherein sealing members are applied to all gaps between said connecting member and said supporting member which connect at least two spaces through which said connecting member passes.

11. An image sensor according to claim 10, wherein a connecting member, for electrically connecting said image sensor and an information processing apparatus on which said image sensor is mounted, is disposed at a position at which the connecting member passes through only said space in which said illuminating means, said imaging means, and said photoelectric converting means are disposed.

12. An image sensor according to claim 11 wherein said connecting member is a member for transmitting an image signal transmitted from said photoelectric converting means.

13. An image sensor according to claim 11, wherein said connecting member is a member for supplying required energy to said illuminating means and/or said photoelectric converting means.

14. An image sensor comprising:

illuminating means for illuminating an image information surface of an original document;

imaging means for imaging light reflected from said image information surface of said original document by said illuminating means;

a light receiving device for photoelectrically converting said reflected light, and for receiving said image information;

a supporting member for integrally holding said illuminating means, said imaging means, and said light receiving device; and a fixing member for securing said supporting member, wherein said supporting member is made of an electrically conductive material, and an insulating film is formed on the surface of said supporting member, and wherein said fixing member comprises at least electrically conductive portions and said supporting member and said fixing member are secured in such a manner that an electrical conduction is established between said supporting member and said fixing member.

15. An image sensor according to claim 14, wherein said fixing member comprises:

a screw, at least the surface of which is electrically conductive;

and said supporting member is tapped so that a thread hole, which receives said screw; is formed in said supporting member in such a manner that said film is removed and an electrical conduction is, on at least the surface of said thread hole, established between said supporting member and said fixing member when said screw is fixed.

16. An image sensor according to claim 15, wherein said supporting member is arranged in such a manner that a contact surface of said supporting member, comprising a portion or the overall portion of its surface which comes into contact with said fixing member, has no film formed thereon and an electrical conduction is, via said contact surface, established between said supporting member and said fixing member.

17. An image sensor according to claim 14, wherein said fixing member for securing said supporting member comprises:

a screw, at least the surface of which is electrically conductive, and wherein said supporting member is machined at a portion at which a seating surface of said screw comes into contact with said supporting member in such a manner that said insulating film is removed, and wherein said supporting member is tapped so that a thread hole for receiving said screw is formed in said supporting member and an electrical conduction is, on at least said seating surface of said screw and the surface of said thread hole, established between said supporting member and said fixing member when said screw is fixed.

18. A method of manufacturing an image sensor comprising the steps of:
forming a film on a frame of said image sensor; and
machining a portion of said frame to remove said film at a contact surface.

19. An image sensor according to claim 18, wherein a mask is applied to a contact surface portion of aid frame prior to said film forming step thereby eliminating the need for said machining step.

20. An image sensor including:
illuminating means for illuminating an image information surface of an original document;
imaging means for imaging light reflected from said surface of said original document by said illuminating means;
a light receiving device for photoelectrically converting said reflected light at an imaging surface of said device, and for reading image information;
a supporting member for integrally holding said illuminating means, said imaging means, and said light receiving device;
at least two independent hollow portions comprising a first independent hollow portion which alone houses said illuminating means, said imaging means, and said light receiving device; and
a second hollow portion formed adjacent to said first hollow portion and in communication with an outside of said image sensor.

21. An image sensor according to claim 20, wherein a side plate, secured to a side surface of said supporting member, is provided and a communication port formed in said side plate causes said second hollow portion to be opened to the outside.

22. An image sensor according to claim 20, wherein said second hollow portion is disposed adjacent to said illuminating means.

23. An image sensor according to claim 20, wherein one or more radiation fins are disposed i said second hollow portion.

24. An image sensor according to claim 20, wherein at least one of said radiation fins are disposed adjacent to said illuminating means.

25. An information processing apparatus comprising:
an image sensor having a supporting member for integrally supporting a reading system which includes illuminating means for illuminating an original document, photoelectric converting means, and imaging means for imaging light reflected by the surface of said original document onto said photoelectric converting means, said image sensor also having a member disposed on a side surface of said supporting member, said image sensor comprising:
two or more substantially independent spaces formed in said supporting member, wherein
said illuminating means, said imaging means, and said photoelectric converting means are disposed in only one of said spaces, and wherein screws for use in assembling said image sensor are arranged in such a manner that at least the leading portions of said screws appear outside of said space housing said illuminating means, said imaging means, and said photoelectric converting means.

26. An information processing apparatus according to claim 25 further comprising means for positioning said original document at a position a which said image sensor reads said original document.

27. An information processing apparatus according to claim 26 further comprising recording means for recording image information read by aid image sensor.

28. An information processing apparatus according to claim 26, wherein said recording means is a recording head which discharges ink by utilizing thermal energy.

29. An information processing apparatus comprising:
an image sensor having a supporting member for integrally supporting a reading system which includes illuminating means for illuminating an original document, a photoelectric converting means, and imaging means for imaging light reflected by the surface of said original document onto said photoelectric converting means, said image sensor also having a member disposed on a side surface of said supporting member, said image sensor comprising:
two or more substantially independent spaces formed in said supporting member, wherein said illuminating means, said imaging means, and said photoelectric converting means are disposed in only one of said spaces; and
screws for use in assembling said image sensor, wherein at least the leading portions of all of aid screws, except for those screws used for fixing said imaging means, appear outside of said image sensor or outside of said space in which said illuminating means, said imaging means, and said photoelectric converting means are disposed.

30. An information processing apparatus according to claim 29 further comprising means for positioning said original document at a position at which said image sensor reads said original document.

31. An information processing apparatus according to claim 30 further comprising recording means for recording image information read by said image sensor.

32. An information processing apparatus according to claim 30 wherein said recording means is a recording head which discharges ink by utilizing thermal energy.

33. An information processing apparatus comprising:
an image sensor having a supporting member for integrally supporting a reading system which includes illuminating means for illuminating an original document, a photoelectric converting means, and imaging means for imaging light reflected by the surface of said original document onto said photoelectric converting means, said image sensor also having a member disposed on a side surface of said supporting member, said image sensor comprising:
two or more substantially independent spaces formed in said supporting member, and wherein said illuminating means, said imaging means, and said photoelectric converting means are disposed in only one of said spaces; and
at least one connecting member, for connecting said image sensor and an information processing apparatus, which passes through at least two of said spaces via a hole in said supporting member, on which said image sensor is mounted, and appears outside of said image sensor via said supporting member, wherein sealing members are applied to all gaps between said connecting member and said supporting member which connect at least two spaces through which said connecting member passes.

34. An information processing apparatus according to claim 33 further comprising means for positioning said original document at a position at which said image sensor reads said original document.

35. An information processing apparatus according to claim 34 further comprising recording means for recording image information read by said image sensor.

36. An information processing apparatus according to claim 34, wherein said recording means is a recording head which discharges ink by utilizing thermal energy.

37. An information processing apparatus including an image sensor comprising:
 illuminating means for illuminating an image information surface of an original document;
 imaging means for imaging light reflected from said image information surface of said original document by said illuminating means;
 a light receiving device for photoelectrically converting said reflected light, and for receiving said image information;
 a supporting member for integrally holding said illuminating means, said imaging means, and said light receiving device; and
 a fixing member for securing said supporting member, wherein
 said supporting member is made of an electrically conductive material, and an insulating film is formed on the surface of said supporting member, and wherein
 said fixing member comprises at least electrically conductive portions and said supporting member and said fixing member are secured in such a manner that an electrical conduction is established between said supporting member and said fixing member.

38. An information processing apparatus according to claim 37 further comprising means for positioning said original document at a position at which said image sensor reads said original document.

39. An information processing apparatus according to claim 38 further comprising recording means for recording image information read by said image sensor.

40. An information processing apparatus according to claim 38, wherein said recording means is a recording head which discharges ink by utilizing thermal energy.

41. An information processing apparatus comprising:
 illuminating means for illuminating an image information surface of an original document;
 imaging means for imaging light reflected form said surface of said original document by said illuminating means;
 a light receiving device for photoelectrically converting said reflected light at an imaging surface of said device, and for reading image information;
 a supporting member for integrally holding said illuminating means, said imaging means, and said light receiving device;
 at least two independent hollow portions comprising a first independent hollow portion which alone houses said illuminating means, said imaging means, and said light receiving device; and
 a second hollow portion formed adjacent to said first hollow portion and in communication with an outside of said image sensor.

42. An information processing apparatus according to claim 41 further comprising means for positioning said original document at a position at which said image sensor reads said original document.

43. An information processing apparatus according to claim 42 further comprising recording means for recording image information read by said image sensor.

44. An information processing apparatus according to claim 42, wherein said recording means is a recording head which discharges ink by utilizing thermal energy.

* * * * *

UNITED STATES PATENT AND TRADEMARK OFFICE
CERTIFICATE OF CORRECTION

PATENT NO. : 5,281,803
DATED : January 25, 1994
INVENTOR(S) : HARUO ISHIZUKA

It is certified that error appears in the above-identified patent and that said Letters Patent is hereby corrected as shown below:

COLUMN 1

Line 41, "seriously" should read --serious--.
Line 49, "not" should be deleted.

COLUMN 2

Line 10, "ously" should read --ous--.

COLUMN 3

Line 17, "be" should be deleted.
Line 27, "trates" should read --trate--.
Line 64, "trates" should read --trate--.
Line 66, "17B" should read --17B are--.
Line 67, "trates" should read --trate--.

COLUMN 4

Line 4, "19B" should read --19B are--.
Line 5, "tratres" should read --trate--.

COLUMN 5

Line 44, "passes" should read --pass--.

COLUMN 6

Line 64, "order" should read --order to--.

UNITED STATES PATENT AND TRADEMARK OFFICE
CERTIFICATE OF CORRECTION

PATENT NO. : 5,281,803
DATED : January 25, 1994
INVENTOR(S) : HARUO ISHIZUKA

It is certified that error appears in the above-identified patent and that said Letters Patent is hereby corrected as shown below:

COLUMN 7

Line 42, "appear" should read --appears--.

COLUMN 8

Line 30, "like;" should read --like,--.
    Line 34, "Omi;" should read --Omi,--.
    Line 36, "Tanaka;" should read --Tanaka,--.

COLUMM 9

Line 39, "droplet" should read --droplets--.

COLUMN 10

Line 37, "it" should read --it is--.

COLUMN 11

Line 21, "Also" should read --Also,--.

COLUMN 12

Line 4, "frame 1" should read --frame 1,--.
    Line 46, "shinking" should read --sinking--.
    Line 66, "he" should read --the--.
    Line 68, "Also" should read --Also,--.

UNITED STATES PATENT AND TRADEMARK OFFICE
CERTIFICATE OF CORRECTION

PATENT NO. : 5,281,803
DATED : January 25, 1994
INVENTOR(S) : HARUO ISHIZUKA

It is certified that error appears in the above-identified patent and that said Letters Patent is hereby corrected as shown below:

COLUMN 15

Line 18, "is" should read --does--.
Line 64, "portion" should read --portions--.

COLUMN 16

Line 29, "particularly," should read --particularity,--.
Line 38, "or" should read --for--.
Line 63, "claim 2" should read --claim 2,--.
Line 67, "claim 2" should read --claim 2,--.

COLUMN 17

Line 42, "claim 7" should read --claim 7,--.

COLUMN 18

Line 11, "claim 11" should read --claim 11,--.
Line 48, "screw;" should read --screw,--.

COLUMN 19

Line 48, "i" should read --in--.

UNITED STATES PATENT AND TRADEMARK OFFICE
CERTIFICATE OF CORRECTION

PATENT NO. : 5,281,803
DATED : January 25, 1994
INVENTOR(S) : HARUO ISHIZUKA

It is certified that error appears in the above-identified patent and that said Letters Patent is hereby corrected as shown below:

COLUMN 20

Line 6, "claim 25" should read --claim 25,--.
Line 10, "claim 26" should read --claim 26,--.
Line 32, "aid" should read --said--.
Line 39, "claim 29" should read --claim 29,--.
Line 43, "claim 30" should read --claim 30,--.
Line 46, "claim 30" should read --claim 30,--.

COLUMN 21

Line 8, "claim 33" should read --claim 33,--.
Line 12, "claim 34" should read --claim 34,--.

UNITED STATES PATENT AND TRADEMARK OFFICE
CERTIFICATE OF CORRECTION

PATENT NO. : 5,281,803
DATED : January 25, 1994
INVENTOR(S) : HARUO ISHIZUKA

It is certified that error appears in the above-identified patent and that said Letters Patent is hereby corrected as shown below:

COLUMN 22

Line 4, "claim 37" should read --claim 37,--.
Line 8, "claim 38" should read --claim 38,--.
Line 16, "form" should read --from--.
Line 33, "claim 41" should read --claim 41,--.
Line 37, "claim 42" should read --claim 42,--.

Signed and Sealed this

Sixth Day of September, 1994

Attest:

BRUCE LEHMAN

Attesting Officer    Commissioner of Patents and Trademarks